April 3, 1928.   G. R. UHL   1,664,714

FAUCET

Filed April 25, 1927

INVENTOR.
George R. Uhl.
BY
Thorpe & Seward  ATTORNEYS.

Patented Apr. 3, 1928.

1,664,714

UNITED STATES PATENT OFFICE.

GEORGE R. UHL, OF KANSAS CITY, KANSAS.

FAUCET.

Application filed April 25, 1927. Serial No. 186,313.

This invention relates to shut-off valves and is designed for use primarily in plumbing fixtures, such as faucets and the like, and the object is to produce an all metal faucet which can be operated easily and quickly and which shall efficiently guard against the escape or leakage of water up through the cap of the faucet. A further object is to produce a shut-off valve mechanism of the character mentioned which is of simple, strong, durable and inexpensive construction. A still further object is to produce a valve in which wear of the operative parts shall be taken up automatically for the purpose of guarding against escape of water up through the cap of the valve.

With the objects mentioned in view, the invention consists in certain novel and useful features of construction and combinations of parts as hereinafter described and claimed; and in order that it may be fully understood, reference is to be had to the accompanying drawing, in which:

Figure 1:
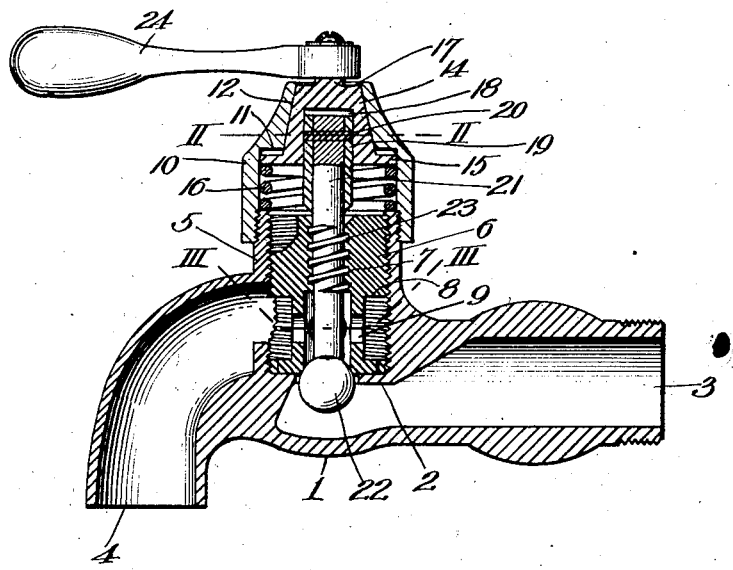
Figure 1 is a central vertical longitudinal section of a faucet equipped with a valve embodying the invention, a tubular plug of the faucet being broken away to indicate that its external threads are reversed with respect to its internal threads.
Figure 2:
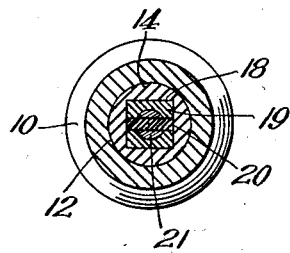
Figure 2 is a horizontal section on the line II—II of Figure 1.
Figure 3:
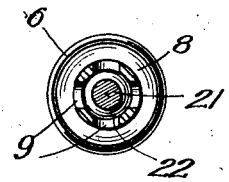
Figure 3 is a horizontal section on the line III—III of Figure 1.

Referring to the drawing in detail, 1 indicates a faucet provided with a perforated partition 2 dividing the faucet into a passage 3 for receiving water from the service pipes (not shown), and a discharge spout 4.

The faucet is provided with the customary upwardly-projecting cylindrical body portion 5 which is internally and externally threaded, the internal threads being adapted for engagement by a tubular threaded plug 6, the bore of said plug being divided into an upper threaded portion 7,—the thread being of the box or square type by preference,—and a lower smooth portion of slightly greater diameter and providing a downwardly-facing valve seat at its lower end in communication, when the valve is open as hereinafter explained, with chamber or passage 3. It will be noted that the plug 6 bears upon the partition 2, and the meeting faces of said partition and plug provide a ground joint impervious to the passage of water. The lower portion of the plug is provided with an external circumferential groove 8 providing a chamber in communication with the spout 4, and the wall of the grooved portion is formed with a plurality of openings 9, through which water, admitted to the enlarged or lower portion of the bore of the plug when the valve is open, may enter the groove 8 and pass freely therefrom through the spout.

A cap 10 is screwed upon the external threads of the cylindrical body portion 5 of the faucet, and is provided with a downwardly-facing internal shoulder 11 and above the same with an upwardly-tapering or conical passage 12. A conical plug 14 fits in the socket 12 and is provided at its lower end with an outwardly-projecting flange 15 held normally adjacent the shoulder 11 of the cap, by a spring 16 interposed between the conical plug and the upper end of the body portion 4 of the faucet, the said plug being provided with a stem 17 projecting upwardly through the cap.

The said plug is provided with an angular socket 18 receiving a correspondingly contoured sleeve 19 pinned as at 20 upon the upper end of the valve stem 21, said stem extending through the bore of the plug 6 and being equipped at its lower end with a spherical head 22 for engaging the valve seat at the lower end of plug 6, with a water-tight relation. The stem is provided with a thread 23 engaging the corresponding thread 7 of plug 6, the external threads of the plug 6 and the threads of the stem 21 being reversed so that the operation of the stem shall have no tendency to turn the plug, and the lower end of the sleeve 19 and the opposing portion of the upper end of plug 6 are preferably correspondingly bevelled, so that when the valve is fully opened, said portions shall engage with a water-tight joint and thus prevent water entering the cap. In this connection it will be noted that the pressure of the spring 16 upon the bottom of the cone holds the latter at all times seated with a water-tight joint on the conical bore of the cap, and hence guards against the leakage of water at any time through the top of the cap, whereas the water-tight joint established between the top of the plug 6 and the lower end of the sleeve 19, occurs only when the valve is fully opened, and at such time prevents water entering the cap. A double guard is thus provided against escape of water from the top of the cap as is so frequently encountered with the conventional forms of faucets, after a comparatively short period of service.

A handle 24 of any suitable design or type is mounted upon the stem 17 where it projects from the top of the cap, and is secured rigidly upon said stem in the conventional manner indicated or in any other suitable manner.

When the valve is closed, the head 22 is in engagement with the valve seat at the lower end of plug 6, as shown, and to open the valve the handle is turned in the proper direction. This results in rotating the conical plug, and said plug in turn imparts rotation to the valve stem, and the latter due to the fact that it bears a threaded relation to plug 6, moves downwardly and unseats the valve. During this operation water may work up around the threaded stem into the cap but cannot escape because of the water-tight relation between the cone and cap. The unseating movement of the valve is limited or arrested by the engagement of the lower end of the sleeve with the opposing surface of the plug 6, which engagement, as hereinbefore stated, establishes an intermediate water-tight joint which prevents water from entering the cap at all, so that water admitted to the enlarged portion of the bore of plug 6, must pass off through the spout, with none of it spurting up into or through the cap. With a faucet of this character, the repeated engagements of the valve with its seat and of the sleeve with the upper end of the plug, will result in making the joints more perfect, and in the event wear develops which would impair these joints it will be taken up automatically, as a slightly increased range of movement of the handle in one direction will bring the valve tightly to its seat and in the reverse direction will bring the sleeve tightly down on plug 6, it being also noted that the spring 16 which is of considerable strength and under considerable tension, will always maintain the cone in water-tight relation with the conical socket or passage of the cap.

From the above description, it will be apparent that I have produced a valve mechanism for faucets which embodies the features of advantage set forth as desirable in the statement of the objects of the invention, and while I have illustrated the preferred construction, it is to be understood that changes may be made in the form and proportion of the parts and in other respects without departing from the principle of construction and mode of operation involved or from the spirit and scope of the appended claims.

What I claim is:

1. In a device of the character described, a body portion, a stationary plug therein having a passage, a cap on the body portion, a stem extending through the passage of said plug, a sleeve rigid with the stem, a rotatable plug in the cap, bearing a non-rotatable but sliding relation to said sleeve, means for turning the rotatable plug, and means for effecting slidable movement of the stem as it turns with the rotatable plug, to cause the said sleeve to abut and form a water-tight joint with the opposing end of the stationary plug.

2. The combination with a device having communicating passages, of a plug secured in the device and providing a valve seat at the point of communication of said passages, a cap secured on the device and enclosing the upper part of said plug and provided with a conical passage, a cone fitting rotatably in said conical passage, a spring for holding the cone pressed against the wall of said conical passage, a stem extending through the said plug and bearing a threaded relation thereto and provided at its lower end with a valve engaging said valve seat and connected at its upper end to rotate with and slide relatively to said cone, and means for rotating the cone.

3. The combination with a device having communicating water passages, of a plug screwed into said device and providing a downwardly-facing valve seat at the point of communication of said passages and provided at its lower end with a chamber in communication with one of said passages at all times, a cap secured upon said device and enclosing the upper portion of said plug and provided with a conical passage, a cone fitting rotatably in the conical passage of the cap, a spring within the cap and bearing at its opposite ends against the said device and the opposing face of the cone, a stem extending through and bearing a threaded relation to said plug which is reversed to the threaded relation of the latter with the said device; said stem being rotatable with but slidable relative to said cone and provided at its lower end with a valve or head engaging the valve seat of said plug, and means exterior to the cap, for rotating said cone in one direction to effect unseating of the valve and in the reverse direction to reseat the valve.

4. The combination with a device provided with communicating water passages, of a plug secured in the device and providing a valve seat at the point of communication between said passages and having a bore communicating with one of said passages at all times, a cap fastened upon the device and enclosing the upper end of said plug, and provided with a conical passage, a cone fitting in said passage and provided with an angular socket, a spring holding the cone in water-tight relation with the wall of said conical passage, and a stem threaded to and extending through the plug and fitting non-rotatably but slidably in the socket of the cone, and provided at its lower end with a valve or head engaging the valve seat.

5. The combination with a device having communicating passages, a plug secured in the device and having a chamber communicating with one of said passages at all times, and provided at its lower end with a downwardly-facing valve seat, a cap secured upon the said device and enclosing the upper end of said plug and provided with a conical passage, a cone fitting rotatably in said conical passage and provided with an angular socket, a spring holding the cone in water-tight relation with the wall of said passage, means for turning the cone, a sleeve fitting non-rotatably but slidingly in the socket of the cone and depending therefrom, and a stem fitting in and rotatable with said sleeve and extending through and bearing a threaded relation to said plug and provided at its lower end with a valve engaging said valve seat.

In witness whereof I hereunto affix my signature.

GEORGE R. UHL.